(12) United States Patent
Chen et al.

(10) Patent No.: US 9,465,182 B2
(45) Date of Patent: Oct. 11, 2016

(54) FIBER OPTIC CABLE ASSEMBLY WITH MICRO-DUCT PROTECTION

(71) Applicant: Verizon Patent and Licensing Inc., Arlington, VA (US)

(72) Inventors: David Z. Chen, Richardson, TX (US); Christina M. Colasanto, New Ipswich, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 14/319,595

(22) Filed: Jun. 30, 2014

(65) Prior Publication Data
US 2015/0378123 A1  Dec. 31, 2015

(51) Int. Cl.
*G02B 6/44* (2006.01)
*G02B 6/50* (2006.01)

(52) U.S. Cl.
CPC ............ *G02B 6/4459* (2013.01); *G02B 6/4436* (2013.01); *G02B 6/4464* (2013.01); *G02B 6/504* (2013.01)

(58) Field of Classification Search
CPC .. G02B 6/443; G02B 6/4436; G02B 6/4438; G02B 6/4459; G02B 6/4464
USPC .................................................. 385/107, 113
See application file for complete search history.

(56) References Cited

U.S. PATENT DOCUMENTS

| 3,784,238 | A | * | 1/1974 | Chance | .................... | E21B 17/16 |
| | | | | | | 175/325.1 |
| 2009/0046983 | A1 | * | 2/2009 | Varkey | .................... | G02B 6/443 |
| | | | | | | 385/113 |
| 2010/0232752 | A1 | * | 9/2010 | Labraymi | ............ | G02B 6/4475 |
| | | | | | | 385/99 |

* cited by examiner

*Primary Examiner* — Ryan Lepisto

(57) ABSTRACT

A fiber optic cable assembly may include a fiber optic cable that has a jacket and a plurality of optical fibers enclosed by and extending longitudinally within the jacket. The fiber optic cable assembly may also include a micro-duct disposed around at least a portion of the jacket, for example, where the cable is buried below grade. The fiber optic cable assembly may further include an insulating layer disposed around at least a portion of the micro-duct, and an outer layer disposed around the insulating layer. The insulating layer and the outer layer may protect the micro-duct and the cable in the event of high temperature exposure that may arise from nearby high temperature utilities, such as in a manhole, as well as to enable the fiber optic cable to be air jetted through the micro-duct from a starting point to a terminating point of a cable routing path.

10 Claims, 3 Drawing Sheets

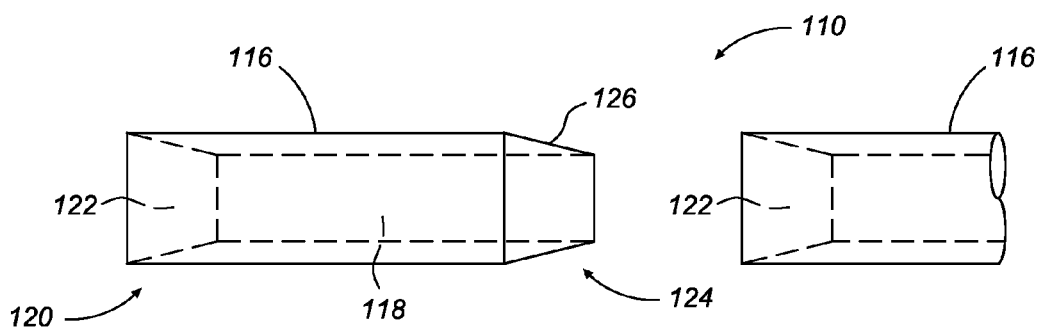
FIG. 4
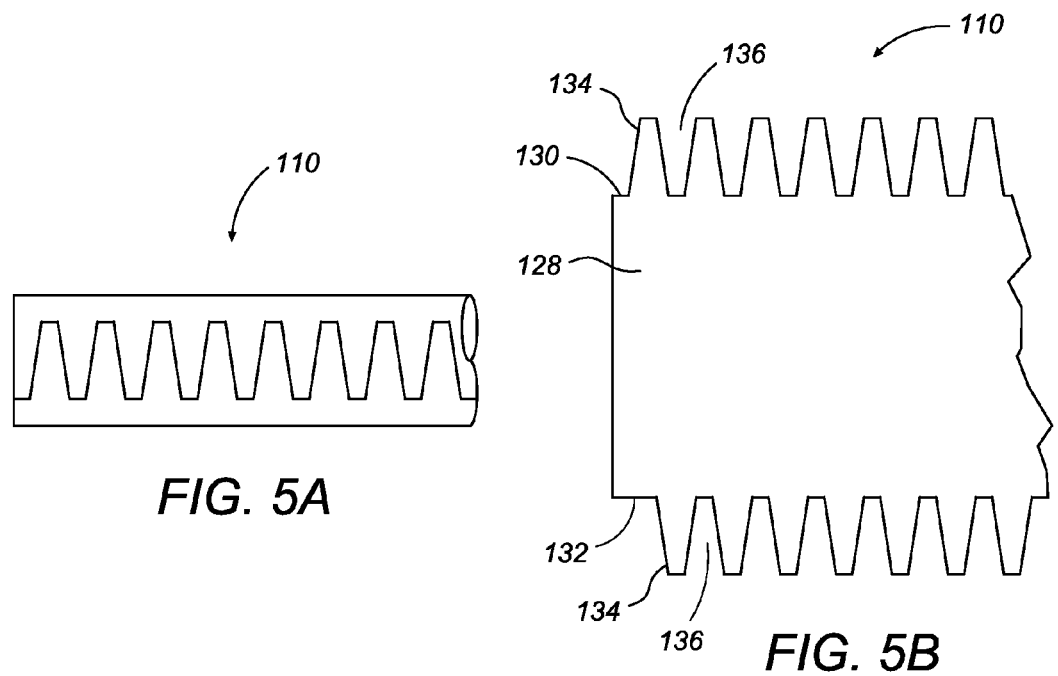
FIG. 5A
FIG. 5B
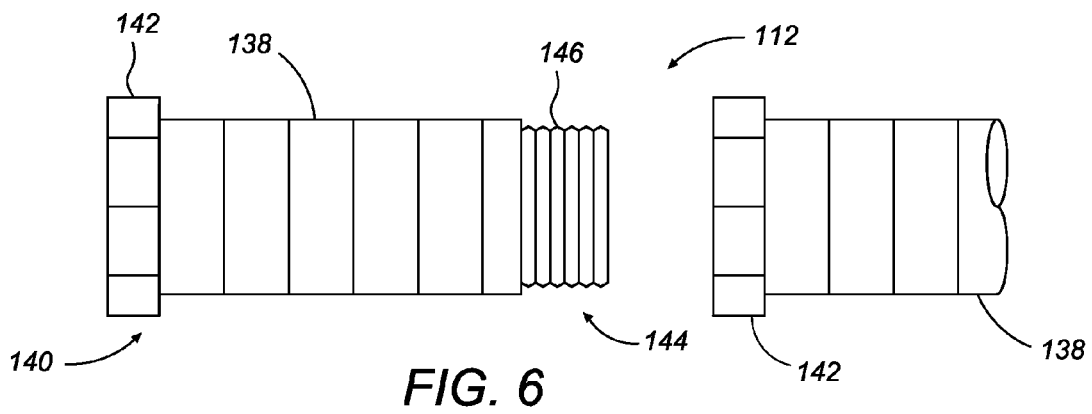
FIG. 6

FIBER OPTIC CABLE ASSEMBLY WITH MICRO-DUCT PROTECTION

BACKGROUND

Fiber optic cables are often installed across long distances from a starting point to a terminating point, and are often buried in the ground. In areas where construction and deep excavation may be expensive and disruptive to the area, such as in high traffic cities, at least one micro-duct may be buried at a shallow depth in the ground, thereby minimizing the amount of excavation. This may be done, for example, on sidewalks or pathways in the cities. The fiber optic cable may then be placed within the micro-duct from the starting point to the terminating point, which may be accomplished by blowing the fiber optic cable via compressed air and machine-assisted pushing (air jetting), pushing the cable and/or pulling the cable through the micro-duct.

In some situations, the fiber optic cable may need to pass through at least one manhole or other access chamber through which other utility lines may also pass. These utility lines may often carry high temperature utilities, including but not limited to steam, hot water, and the like, the temperatures of which may be as high as 300 degrees Celsius. While the utility lines are generally insulated and shielded to protect surrounding areas from the heat radiating from the lines, such insulation and protection may fail due to any number of reasons, and the heat from the utility line may then radiate within the manhole, thereby increasing the temperature exposure to the micro-duct and the fiber optic cable. In addition, the actual utility line may burst due to corrosion, mechanical vibrations, and the like, further exacerbating the temperature exposure.

In an exemplary scenario of a bursting steam pipe, the steam may flow out of the pipe into the manhole, and may come into contact with the micro-duct, which generally is not designed to handle such high temperatures. To plan for such an event, a heavy-duty cable may be used in the manhole instead of the micro-duct. The micro-duct buried in the ground generally may be terminated at the entrance into and the exit from the manhole, and the heavy-duty cable may be installed within the manhole to connect these termination points. The fiber optic cable may then be air jetted from points downstream and upstream of the manhole to the respective termination points of the micro-duct. The fibers within the fiber optic cable, which may number as many as 144 fibers, may then be spliced with fibers in the heavy-duty cable within the manhole at both ends of the heavy-duty cable, which may be very complicated, labor-intensive, and therefore costly work.

BRIEF DESCRIPTION OF THE DRAWINGS

FIG. 4 illustrates an exemplary insulation layer of the fiber optic assembly of FIG. 2 in a tubular configuration;

FIGS. 5A and 5B illustrate another exemplary insulation layer of the fiber optic cable assembly of FIG. 2 in an assembled state and a disassembled state, respectively, of a sheet configuration;

FIG. 6 illustrates an exemplary outer layer of the fiber optic cable assembly of FIG. 2.

DETAILED DESCRIPTION

Fiber optic cable assemblies, which generally may have at least a portion of a fiber optic cable within a micro-duct, are often buried in the ground from a starting point to a terminating point of a routing path of the fiber optic cable. The fiber optic cable assembly may pass through at least one access location, such as a manhole, along the routing path. The manhole may have other utility lines passing through it, where the utilities may be at high temperatures, such as with steam. To protect the micro-duct and therefore the fiber optic cable from potential exposure to high temperatures resulting from the utilities, the fiber optic cable assembly may include an insulating layer disposed around a portion of the micro-duct, and an outer layer disposed around the insulating layer.

The micro-duct generally may be installed first from the starting point of the routing path to a first access location. At the first access location, the insulating layer may be installed around the portion of the micro-duct, and the outer layer may be installed around the insulating layer. The micro-duct then may continue to be installed from the first access location to another access location, e.g., another manhole, along the routing path, and if there is none, then to the terminating point of the routing path. The fiber optic cable may then be inserted, for example via an air jetting process, from the starting point to the terminating point through the micro-duct.

Thus, protection from high temperature exposure may be provided for the micro-duct and fiber optic cable, while reducing installation time and cost by only requiring one insertion step to route the fiber optic cable the entire routing path. The one insertion step may also ensure continuity of the fiber optic cable installation, eliminating the need for any splicing of optical cables and/or fibers within the manholes and any potential mismatching of optical fibers that may occur as a result of the splicing, as well as avoiding potential high insertion loss that may occur due to the optical fiber splice joint(s).

Figure 1:
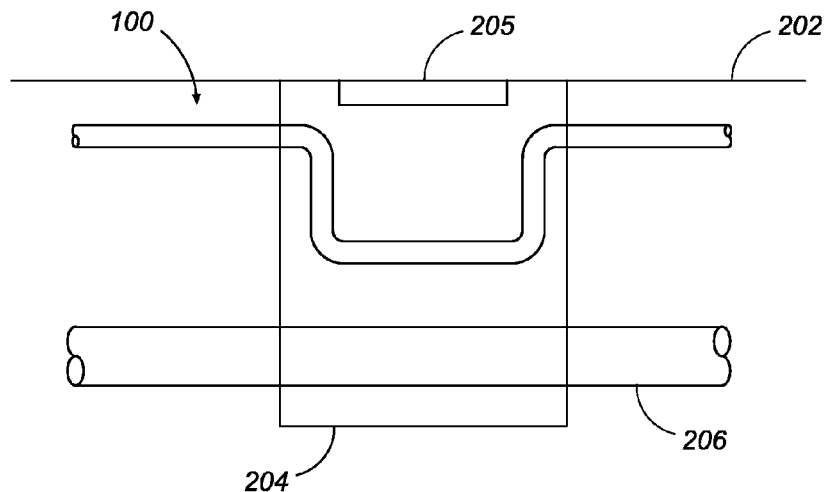
FIG. 1 illustrates a section of an exemplary routing path of an exemplary fiber optic cable assembly with a fiber optic cable within a micro-duct passing through a manhole with another utility line.
Figure 2:
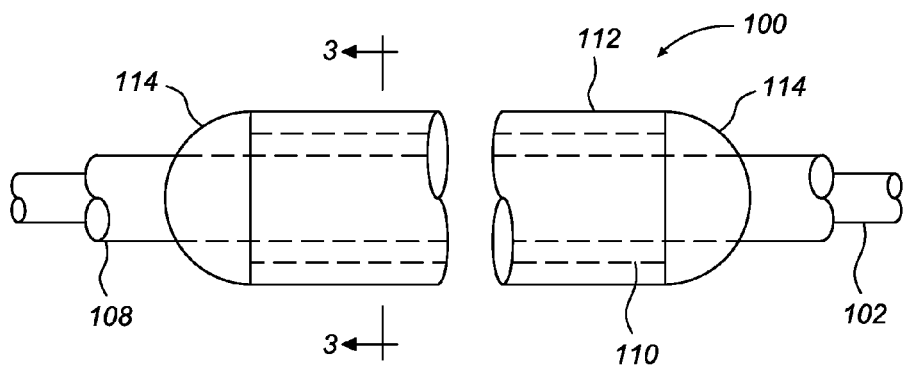
FIG. 2 illustrates the section of the fiber optic cable assembly of FIG. 1 passing through the manhole, the fiber optic cable assembly further having an insulating layer, an outer layer, and end caps.

Referring now to the figures, FIG. 1 illustrates a section of an exemplary routing path of an exemplary fiber optic cable assembly 100. As seen in FIG. 2 and described in more detail hereinafter, the fiber optic cable assembly 100 may include a fiber optic cable 102 routed through a micro-duct 108 that has multiple protection layers. The micro-duct 108 may have multiple sections connected via a micro-duct splice joint (not shown) such that the fiber optic cable assembly 100 may be routed an extended distance. The routing path generally may have a starting point and a terminating point (not shown). At least a portion of the fiber optic cable assembly 100 may be buried below grade 202, and may pass through a manhole 204 at an intermediate location along the routing path. The manhole 204 may have a manhole access point or manhole cover 205, and may have at least one other utility line 206 passing through the manhole 204. The utility line 206 generally may carry a high temperature utility, including, but not limited to, steam, hot water, and the like. While FIG. 1 depicts the fiber optic cable assembly 100 as passing through only one manhole 204, it should be appreciated that the fiber optic cable assembly 100 may pass through any number of manholes 204 or other access locations, such as vaults, building basements, and the like, along the routing path. Furthermore, while the fiber optic cable assembly 100 is shown as having a U-shape within the manhole 204, it should be appreciated that the fiber optic cable assembly 100 may have any number of turns in different directions within the manhole 204, and in each manhole 204 along the routing path, may have unique orientations due to different constraints, including, but not limited to, size of the manholes 204 and number and size of utilities passing through the manholes 204.

Figure 3:
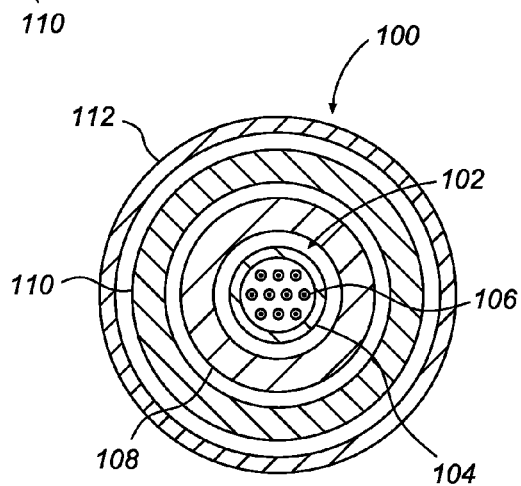
FIG. 3 illustrates a cross-sectional view of the fiber optic assembly of FIG. 2.

Referring now to FIGS. 2 and 3, a section of the fiber optic cable assembly 100 passing through the manhole 204 is shown. The fiber optic cable assembly 100 in this section may include the fiber optic cable 102 within the micro-duct 108, as explained above, an insulating layer 110, an outer layer 112, and end caps 114. The fiber optic cable 102 may have a jacket 104 and a plurality of optical fibers 106 extending longitudinally within the jacket 104. The optical fibers 106 may be free within the jacket 104 or alternatively retained within a matrix material. The micro-duct 108 may be disposed around the jacket 104 to provide protection for the fiber optic cable 102, such as when it is installed below grade 202 as seen in FIG. 1. After the micro-duct 108 is in place, i.e., buried, the fiber optic cable 102 may be inserted through the micro-duct 108, for example via an air jetting process. To better enable the insertion of the fiber optic cable 102, the micro-duct 108 may have an inner diameter (ID) greater than an outer diameter (OD) of the jacket 104 such that there may be an air gap between the fiber optic cable 102 and the micro-duct 108, as seen in FIG. 3. For example, the OD of the jacket 104 may be between 60% and 65% of the ID of the micro-duct 108. The micro-duct 108 may be made of a plastic material, including, but not limited to, polyethylene, polyvinyl chloride (PVC), and the like.

In areas of potential high temperature exposure, such as in the manhole 204, the micro-duct 108 may not be able to withstand the high temperatures, for example if the utility line 206 is a steam pipe that bursts. As such, the insulating layer 110 and the outer layer 112 may serve as protection layers to protect the micro-duct 108 and the fiber optic cable 102 from the high temperature, which may reach up to 300 degrees Celsius. The insulating layer 110 may be disposed around at least a portion of the micro-duct 108, and the outer layer 112 may be disposed around the insulating layer 110 with the end caps 114 located at each end. The insulating layer 110 may have an ID greater than the OD of the micro-duct 108, and the outer layer 112 may have an ID greater than the OD of the insulating layer 110 such that there may be air gaps between the layers, thereby easing installation of the insulating layer 110 and the outer layer 110, as described in more detail below.

The outer layer 112 may serve as a first layer of protection, and may be made of any metallic material, including, but not limited to, copper, aluminum, aluminum alloy, and the like. As such, the outer layer 112, together with the end caps 114, may conduct and/or reflect the heat, as well as protect the fiber optic cable 102 and the micro-duct 108 from radiation. The insulating layer 110 may serve as a second layer of protection that may further insulate and isolate the micro-duct 108 and the fiber optic cable 102 from the heat. The insulating layer 110 may be made of any insulating material, particularly one capable of operating at higher temperatures, including, but not limited to, mineral wool, glass wool, flexible elastomeric foams, rigid foam, cellular glass, and the like. The insulating layer 110 and/or the outer layer 112 may also include a vapor barrier or the like. The insulating layer 110 and the outer layer 112 may be any thickness that does not significantly inhibit routing of the fiber optic cable assembly 100, including bends as described above. As merely an example, the insulating layer 110 may have a thickness in a range from 5 mm to 10 mm, and the outer layer 112 may have a thickness in a range from 0.25 mm to 0.5 mm.

The manhole 204 through which the fiber optic cable assembly 100 may pass may be pre-existing with existing utilities. As such, when the routing path reaches the manhole 204, a new installation of the fiber optic cable assembly 100 in the manhole 204 may need to be routed accordingly to account for the existing utilities and other constraints of the manhole 204, as explained above. To better enable such routing within the manhole 204, components of the fiber optic cable assembly 100, i.e., the micro-duct 108, the insulating layer 110, and the outer layer 112 may be bendable and flexible. It should be appreciated that the insulating layer 110 and the outer layer 112 may be installed at any location along the routing path where it may be desirable to protect the micro-duct 108 and/or the fiber optic cable 102, and not just in the manhole 204, whether from high temperature exposure or any other source of potential damage that may occur.

As mentioned above, the fiber optic cable assembly 100 further may include a cap 114 disposed around the micro-duct 108 at each end of the outer layer 112. The caps 114 may form a seal at the ends of the outer layer 112 to prevent water, debris, or any other foreign substance from entering the fiber optic cable assembly 100 from the ends of the outer layer 112 and/or the insulating layer 110. The caps 114 may be attached to the outer layer 112 and/or the insulating layer 110 via any type of fastening mechanism, and may or may not be made of the same material as the outer layer 112, e.g., a metallic material. In addition, the fiber optic cable assembly 100 may include a seal, gasket, or the like (not shown) between the caps 114 and the outer layer 112 to further ensure that no foreign substance may enter the fiber optic cable assembly 100 from the ends of the outer layer 112 and/or the insulating layer 110.

Figure 7:
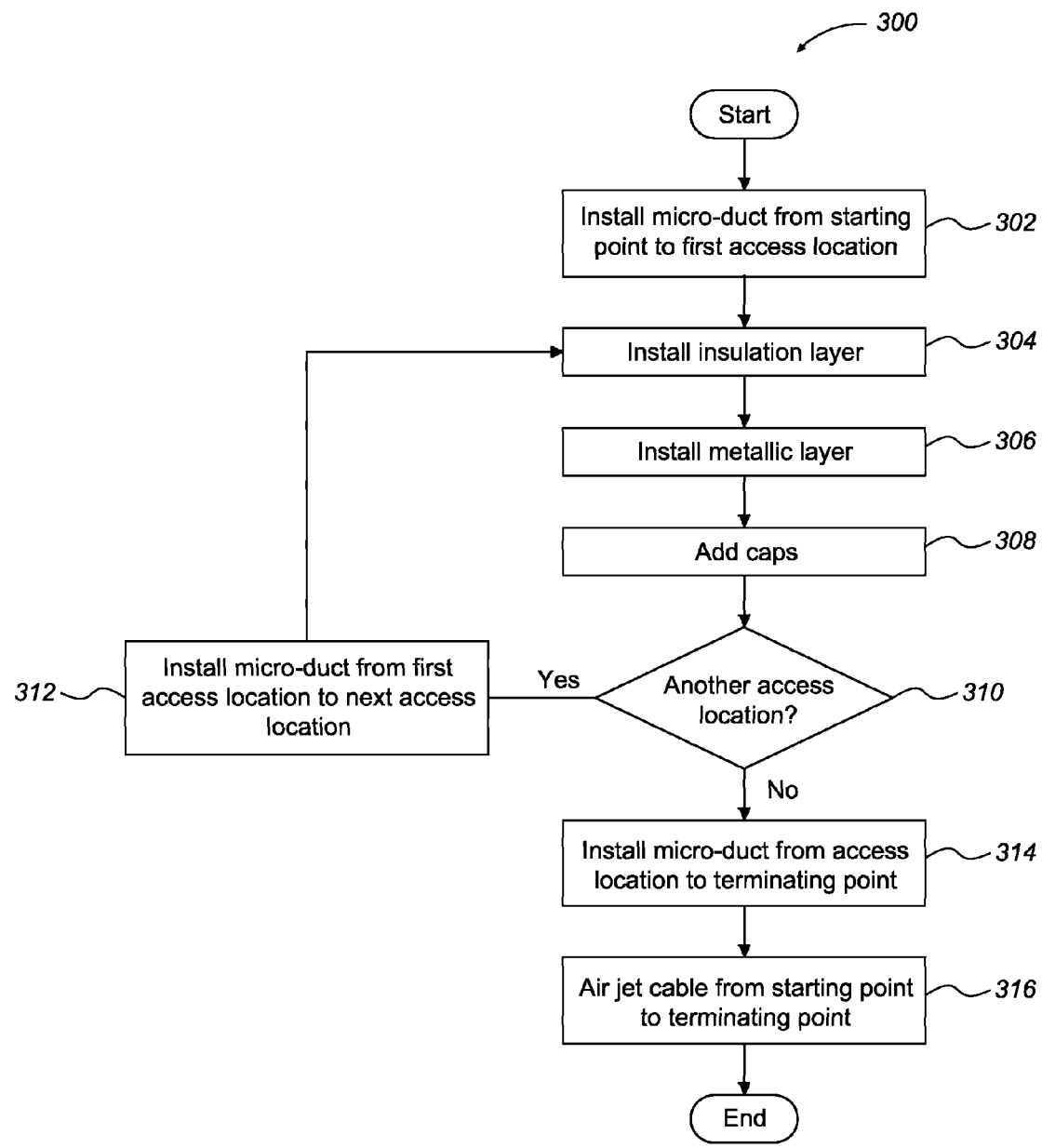
FIG. 7 illustrates an exemplary process flow for installing the micro-duct, insulating layer, and outer layer of the fiber optic cable assembly of FIG. 2, and then air-jetting the fiber optic cable through the micro-duct.

Generally, the micro-duct 108, the insulating layer 110, and the outer layer 112 may be installed prior to the fiber optic cable 102. Having the micro-duct 108, the insulating layer 110, and the outer layer 112 in place first may enable the fiber optic cable 102 to be installed from the starting point to the terminating point of the entire routing path, for example by an air jetting process, without requiring any splicing of the optical fibers 106, thereby enabling best optical performance. An exemplary installation process is depicted in FIG. 7, and is described in more detail in method 300 below.

Referring now to FIG. 4, the insulating layer 110 according to one exemplary approach is shown. The insulating layer 110 may be divided into a plurality of sections 116 in tubular configurations, each of which may be configured to interlock with an adjacent section 116 to form the entire length of the insulating layer 110. To accomplish this, each section 114 may define a passage 118 by which the section 116 may be slid around the micro-duct 108. At a first end 120 of a section 116, an inner surface may be tapered from the first end 120 to within the passage 118 to define a receiving portion 122. At a second end 124 of the section 116, an outer surface may be tapered toward the second end 124 to form a conical portion 126. The conical portion 124 may be matable with an adjacent section 116 at the receiving portion 122. The respective tapers of the receiving portion 122 and the conical portion 126 may be of substantially the same angle and length such that there may be a compressive fit between the receiving portion 122 and the conical portion 126 to enable interlocking of the adjacent sections 116. It should be appreciated that the sections 116 may be interlockable via any other mechanism. The sections 116 may be of any length, and each section 116 may or may not have the same length as other sections 116, depending upon the field conditions and restraints, to enable the most efficient installation.

Incorporating multiple sections 116 for the insulating layer 110 may ease the installation by reducing friction that may be experienced when sliding a single, longer length section over the micro-duct 108. In addition, the multiple sections 116, particularly those having shorter lengths, may allow for more flexibility of the insulating layer 110 to match the orientation of the fiber optic cable assembly 100 that may have multiple bends within the manhole 204.

Referring now to FIGS. 5A and 5B, the insulating layer 110 according to another exemplary approach is shown in an assembled state and a disassembled state, respectively. The insulating layer 110 may include at least one sheet of insulation 128 that has one side 130 that is lockable with an opposite side 132 when wrapped around the portion of the micro-duct 108, as seen in FIG. 5A. To accomplish this, the one side 130 and the opposite side 132 each may have a plurality of tabs 134 along a length of the sheet 128. The tabs 134 may be spaced from each other such that adjacent tabs 134 may define a receiving portion 136 between them. The tabs 134 on the one side 130 may be offset from the tabs 134 on the opposite side 132 such that each tab 134 on one side 130, 132 corresponds to a receiving portion 136 on the other side 132, 130. Each tab 134 may be engageble with the tabs 134 defining the corresponding receiving portion 136 to lock the sides 130, 132 together around the micro-duct 108. For example, the interlocking tabs 134 may have respective male and female components of a locking mechanism (not shown) that enable them to lock into place. It should be appreciated that any other locking mechanism configured to enable the opposite sides 130, 132 to lock with each other when wrapped or folded around the micro-duct 108 may be utilized. For example, one of the sides 130, 132 may include at least one adhesive strip (not shown) with a pealable cover, which may be removed to expose the adhesive strip prior to folding around the micro-duct 108.

The exemplary approach depicted in FIGS. 5A and 5B may enable the sheet of insulation 128 to have a greater length than each of the sections 116 in the exemplary approach depicted in FIG. 4, as friction is not a concern. Furthermore, the approach of FIGS. 5A and 5B may allow the insulating layer 110 to be used for various sizes of the micro-duct 108, as the sheet of insulation 128 is wrapped around the micro-duct 108, and as such, does not have a defined inner diameter, i.e., size of the passage 118.

Referring now to FIG. 6, an exemplary outer layer 112 is shown. As with the insulating layer 110 in the approach depicted in FIG. 4, the outer layer 112 may be divided into a plurality of sections 138, each of which may be configured to interlock with an adjacent section 138 to form the entire length of the outer layer 112. To accomplish this, each section 138 may have a head 142 with a threaded inner portion at a first end 140, and a threaded outer portion 146 at a second end 144. One section 138 may then be screwed via the threaded inner portion of the head 142 around the threaded outer portion 146 of an adjacent section 138. It should be appreciated that adjacent sections 138 may be interlocked with each other via any other mechanism. The sections 138 may be of any length, and each section 138 may or may not have the same length as other sections 138. In addition, a seal, gasket, or the like (not shown) may be provided between the head 142 of one section 138 and the threaded outer portion of the adjacent section 140 to ensure that no foreign substance may enter the fiber optic cable assembly 100 between each section 138.

As with the insulating layer 110, incorporating multiple sections 138 for the outer layer 112 may ease the installation by reducing friction that may be experienced when sliding a single, longer section over the insulating layer 110. In addition, the multiple sections 138, particularly shorter lengths, may allow for more flexibility of the outer layer 112 to match the orientation of the fiber optic cable assembly 100 that may have multiple bends within the manhole 204. As explained above, the outer layer 112 also may be bendable.

Referring now to FIG. 7, an exemplary process 300 for installing the fiber optic cable assembly 100 from a starting point to a terminating point of a routing path is shown. Process 300 begins at block 302 at which a first section of the micro-duct 108 from the starting point to a first access location is installed, (e.g., buried). As explained above, the micro-duct 108 may be installed in sections, with adjacent sections being connected via a micro-duct splice joint. The first access location may be the manhole 204, but may be any location from which the micro-duct 108 may be accessible, such as a vault, a basement of a building, and the like. The first access location generally may have an entrance into and an exit out of the first access location. The micro-duct 108 may terminate beyond the entrance of the first access location such that there is enough length to install the insulating layer 110 and the outer layer 112, as further described below. However, it should be appreciated that the micro-duct 108 may terminate prior to entering the first access location if the micro-duct 108 may be accessible from outside of the first access location, for example during excavation and burial of the micro-duct 108.

At block 304, the insulating layer 110 may be installed around the portion of the micro-duct 104 extending from the entrance of the first access location to the end of the micro-duct 108 installed in block 302. As explained above, this may involve interlocking multiple sections 114 along the length of the insulating layer 110 by successively sliding each section over the micro-duct 108, with each section 116 interlocking with an adjacent section 116, as depicted in FIG. 4. Alternatively, block 304 may involve wrapping or folding a sheet of insulation 128 around the micro-duct 108 and locking two sides 130, 132 of the sheet 128 together, as depicted in FIGS. 5A and 5B.

At block 306, the outer layer 112 may be installed around the insulating layer 110. As explained above, this may involve successively sliding a first section 138 over the insulating layer 110 and micro-duct 108. Each successive section 138 may be interlocked with an adjacent section 138, for example via a screwing mechanism in which one section 138 is screwed via a head 142 over a threaded outer portion 146 of an adjacent section, as depicted in FIG. 6.

Additional sections of micro-duct 108 may be installed as necessary to complete the routing from the entrance of the first access location to the exit of the first access location. Blocks 304 and 306 may be repeated for each section or group of sections of the micro-duct 108 being installed, as required for most efficient installation and depending upon constraints within the first access location, as described above. Alternatively, the entire routing of the micro-duct 108 within the first access location may be completed in block 302.

At block 308, the caps 114 may be added at each end. Depending upon the type of cap used, the first cap 114 may be installed over the micro-duct 108 prior to block 304, and the second cap 114 may be installed at block 308.

At block 310, it may be determined if there is another access location along the routing path, e.g., another manhole 204. If yes, then process 300 may proceed to block 312 at which the micro-duct may be installed from the exit of the first access location to beyond the entrance of the next access location, similar to block 302. Then blocks 304 through 312 may be repeated. If there is not another access location along the routing path, then process 300 may proceed to block 314 at which the micro-duct may be installed from the exit of the first access location to the terminating point of the routing path. At block 316, the fiber optic cable 102 may be inserted into the micro-duct 108 from the starting point to the terminating point. As explained above, this may be accomplished by air jetting the fiber optic cable 102 through the micro-duct 108. Process 300 may end after block 314.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A fiber optic cable assembly, comprising:
a fiber optic cable having a jacket and a plurality of optical fibers enclosed by and extending longitudinally within the jacket;
a micro-duct disposed around at least a portion of the jacket;
an insulating layer disposed around at least a portion of the micro-duct, the insulating layer having a plurality of sections each interlockable with an adjacent section, each section having a first end and a second end, an inner surface of each section being tapered from the first end to define a receiving portion, and an outer surface being tapered toward the second end to form a conical portion, the conical portion of one section being matable with adjacent section at the receiving portion via a compressive fit; and
an outer layer disposed around at least a portion of the micro-duct layer.

2. The fiber optic cable assembly of claim 1, wherein the insulating layer includes at least one sheet of insulation having one side that is lockable with an opposite side when wrapped around the portion of the micro-duct.

3. The fiber optic cable assembly of claim 2, wherein the one side and the opposite side of the at least one sheet each have a plurality of tabs along a length of the at least one sheet, the tabs being spaced from each other such that adjacent tabs define a receiving portion between them, the tabs on the one side being offset from the tabs on the opposite side such that each tab on one side corresponds to a receiving portion on the other side, each tab being engageable with the tabs defining the corresponding receiving portion.

4. The fiber optic cable assembly of claim 1, wherein the outer layer comprises a plurality of sections, each section being interlockable with an adjacent section.

5. The fiber optic cable assembly of claim 4, wherein each section includes a first end having a head with a threaded inner portion, and a second end having a threaded outer portion, one section via the head being screwable around the second end of an adjacent section.

6. The fiber optic cable assembly of claim 1, further comprising a cap disposed around the micro-duct at each end of the outer layer to seal the outer layer at the ends.

7. An assembly for protecting a fiber optic cable, the assembly comprising:
a micro-duct through which the fiber optic cable is insertable;
an insulating layer disposed around at least a portion of the micro-duct in a longitudinal direction, the insulating layer having a plurality of sections each interlockable with an adjacent section, each section having a first end and a second end, an inner surface of each section being tapered from the first end to define a receiving portion, and an outer surface being tapered toward the second end to form a conical portion, the conical portion of one section being matable with adjacent section at the receiving portion via a compressive fit; and
an outer layer disposed around the insulating layer.

8. The assembly of claim 7, wherein the insulating layer includes at least one sheet of insulation having one side that is lockable with an opposite side when wrapped around the portion of the micro-duct.

9. The assembly of claim 7, wherein the outer layer comprises a plurality of sections, each section being interlockable with an adjacent section.

10. The assembly of claim 7, further comprising a cap disposed around the micro-duct at each end of the outer layer to seal the outer layer at the ends.

* * * * *